June 12, 1956   L. E. GARDNER   2,749,941
ROTARY FLUID CONTROL VALVE
Filed June 1, 1950   3 Sheets-Sheet 1
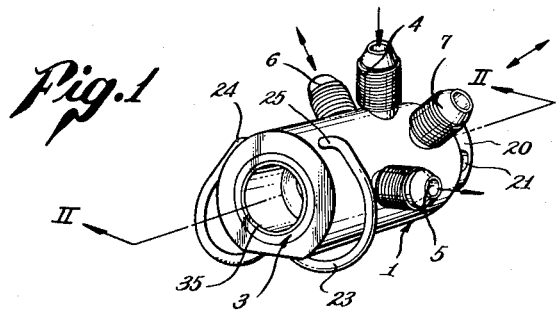
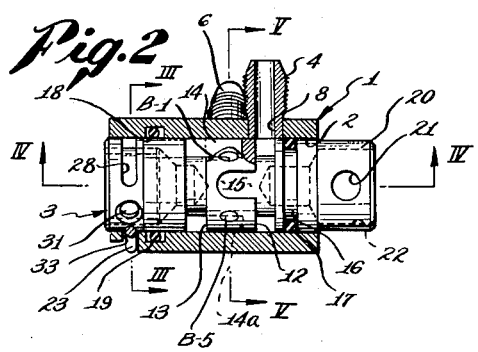
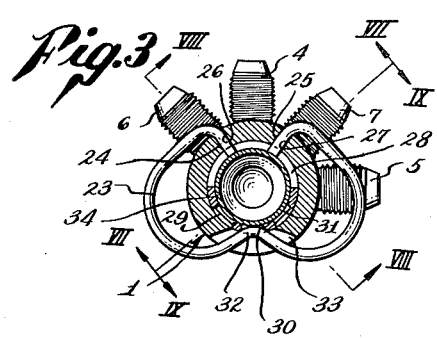
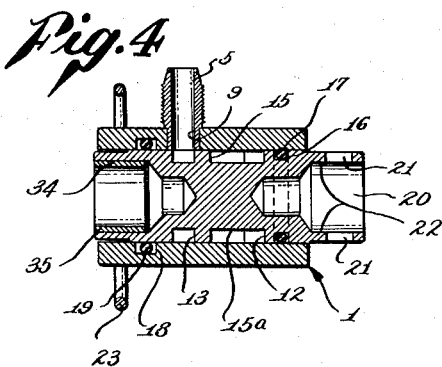
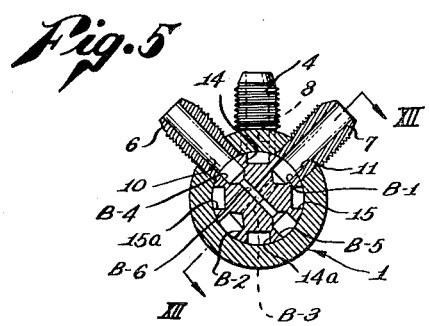
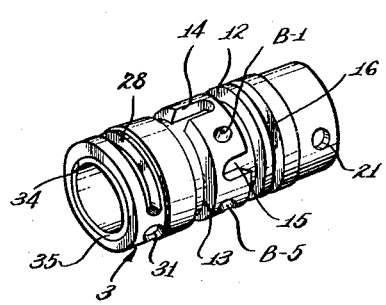
INVENTOR.
LEON E. GARDNER
BY *Fulwider & Mattingly*
Attorneys June 12, 1956 L. E. GARDNER 2,749,941
ROTARY FLUID CONTROL VALVE
Filed June 1, 1950 3 Sheets-Sheet 2
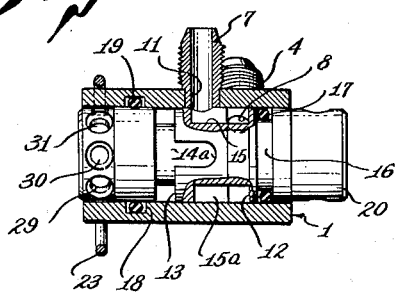
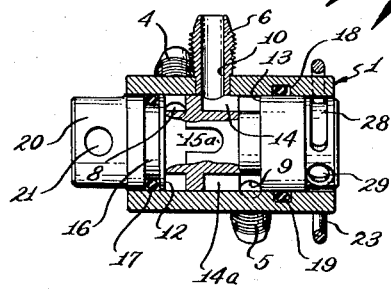
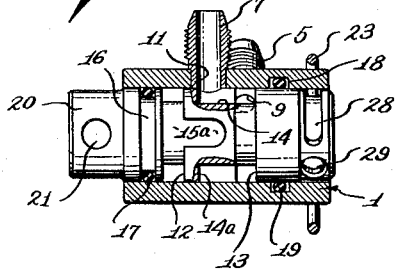
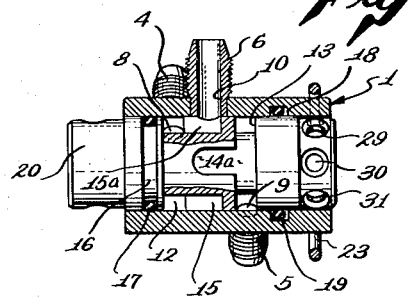
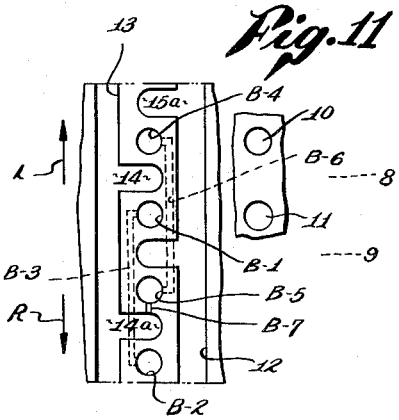
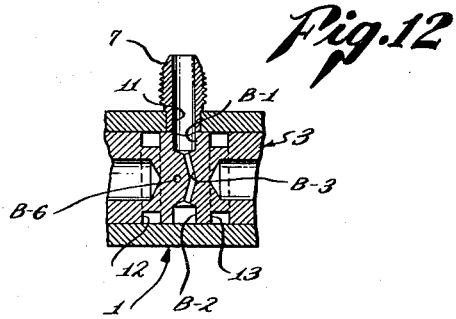
INVENTOR.
LEON E. GARDNER
BY
*Fulwider & Mattingly*
Attorneys

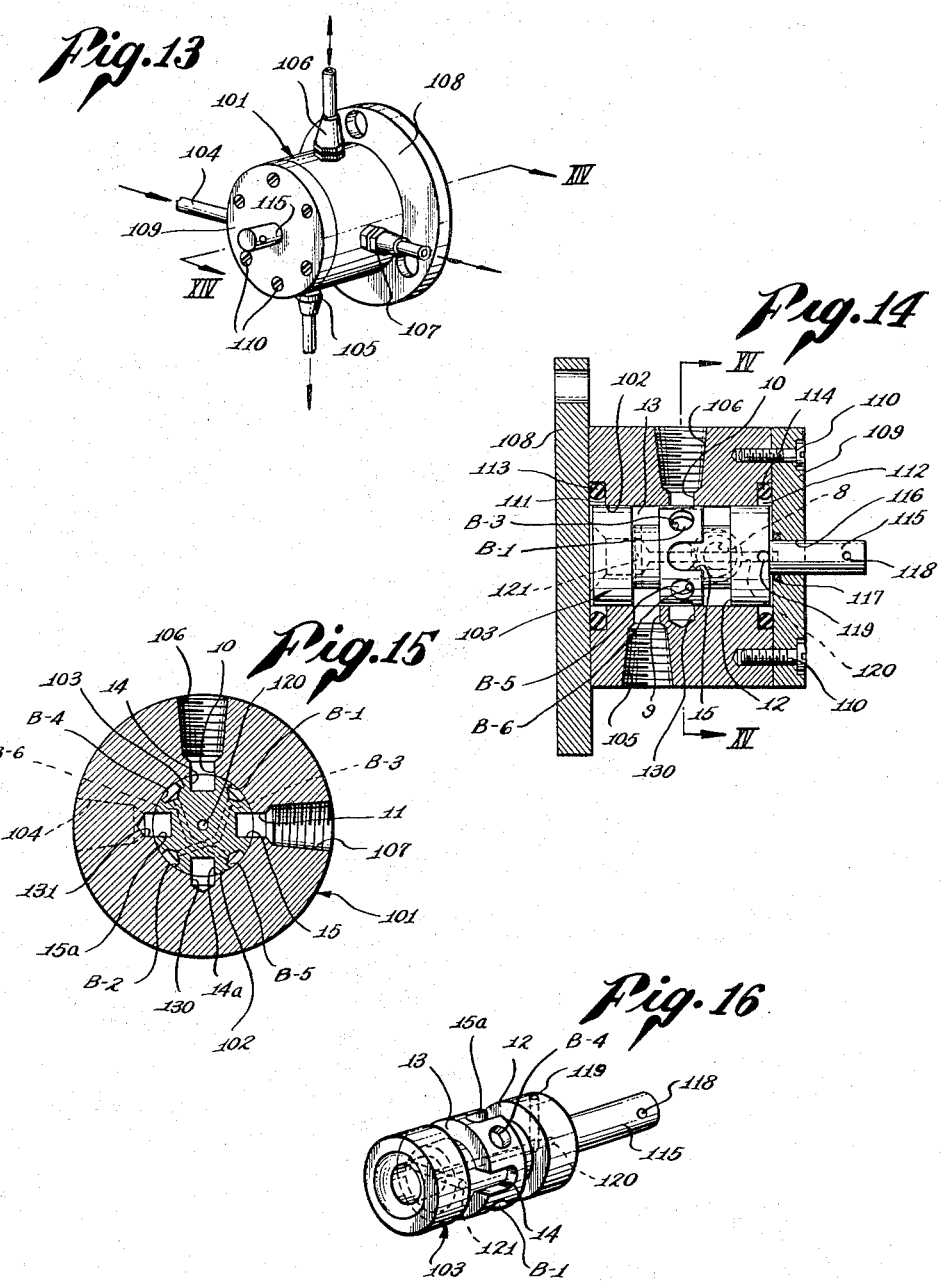

United States Patent Office 2,749,941
Patented June 12, 1956

2,749,941

ROTARY FLUID CONTROL VALVE

Leon E. Gardner, Los Angeles, Calif.; Evelyn M. Gardner, administratrix of said Leon E. Gardner, deceased Application June 1, 1950, Serial No. 165,500

8 Claims. (Cl. 137—624)

My invention relates to fluid control valves, and has particular reference to a balanced valve of the rotary type which is especially suitable for use in high pressure hydraulic systems.

This application is a continuation-in-part of my copending application, Serial No. 661,744, filed April 12, 1946, now abandoned, for Rotary Fluid Control Valve.

In various industries employing hydraulic power systems as motive power for the operation of machinery, it has recently become the practice to utilize relatively high fluid pressures in order to permit relatively small hydraulic motive mechanisms and relatively small fluid lines to be utilized for the control and transmission of large amounts of power. In such systems considerable difficulty has been encountered in providing valves adapted to control high fluid pressures without requiring the exertion of great forces for the manipulation of the valves. The ordinary poppet valve is entirely unsuitable for the reason that the handle load increases substantially in proportion to the increase in the fluid pressure in the system. Slide valves are unsatisfactory chiefly because of the difficulty of mounting the valves, the complexity of the linkage used to connect the handle to the slide, and the inherent tendency of the valve to move with great rapidity between the several control positions as a result of the turbulent flow in the valve passages and in the region of the valve ports.

Rotary valves have proved more satisfactory, but the rotary valves used prior to this invention were not pressure balanced, and under high pressure conditions required the exertion of great forces to the movable valve parts in order to manipulate the valve. For many reasons, it is highly desirable to reduce to a minimum the operating force required to move the valve between its various control positions. For example, in manually operated valves for military aircraft, the government specification requires that the handle force be not more than ten pounds. Inasmuch as the rotary control valves used prior to this invention required a torque of about one hundred and eighty inch pounds, the valve was fitted with an eighteen-inch long lever handle. This, of course, added greatly to the weight of the installation, and vastly increased the complexity of the problem of mounting the valve in such a location as to make the handle readily accessible and easily operated.

The requirement for low operating forces is also met in valves which are operated remotely by automatic mechanisms of one type or another. In the guided missile field, for example, the operation of hydraulic control valves may be initiated by radio signals transmitted from a remote point and received on suitable receiving apparatus carried by the missile. If the torque required to operate the valve can be materially reduced, the size, weight, and complexity of the servo-apparatus which is interposed between the radio receiver and the valve is proportionately reduced. This in turn results in a saving in the cost of the projectile, and what is more important, increases in direct correspondence with the reduction in weight the payload which can be carried by the projectile.

It is therefore an object of my invention to provide a valve which is adapted for the control of hydraulic fluids and which is especially adapted for the control of high fluid pressures without requiring the exertion of great forces in the manipulation of the valve between its various control positions.

Another object of my invention is to provide a rotary valve which is so balanced by the fluid pressures which it controls as to require the exertion of a minimum amount of effort to move the valve to its various control positions.

Another object of my invention is to provide a valve of the character set forth in which the valve is so balanced that it is readily adapted for control from points remote from the location of the valve through simple low-powered operating mechanisms.

It is also an object of my invention to provide a valve of the character set forth wherein the movable valve parts may be readily manipulated under high pressure conditions between their various control positions and which is balanced in any of the intermediate positions, thus adapting the valve to meter or throttle the fluid flow to any desired value lying between full flow and no flow.

It is an additional object of my invention to provide a valve of the character set forth wherein the fluid passages within the valve structure are so designed as to impose a minimum of loss of pressure in the fluid flowing therethrough.

It is a still further object of my invention to incorporate in a valve of the character set forth hereinbefore a sealing mechanism for preventing the loss of fluid which is so arranged as to impose a minimum of resistance to the movement of the movable valve parts.

Other objects and advantages of my invention will be apparent from a study of the following specifications, read in connection with the accompanying drawings, wherein:

Fig. 1 is a perspective view illustrating the general form and appearance of one form of my invention;

Fig. 2 is a longitudinal sectional view taken along a vertical plane as indicated by the line II—II in Fig. 1 showing the rotary member of the valve in elevation with parts broken away and others shown in section to illustrate the details of construction;

Fig. 3 is a cross sectional view taken substantially along the line III—III of Fig. 2 to illustrate the details of construction of the spring detent mechanism;

Fig. 4 is a longitudinal sectional view similar to Fig. 2 but taken along the line IV—IV of Fig. 2 and showing the rotary valve member in section;

Fig. 5 is a cross sectional view taken substantially along the line V—V to illustrate the location and arrangement of the valve ports;

Fig. 6 is a perspective view illustrating the form and construction of the rotating member of the valve;

Fig. 7 is a longitudinal section taken substantially along the line VII—VII of Fig. 3 showing the rotary valve member in elevation with parts broken away and others shown in section to illustrate the manner of interconnection of the various ports in one position of the rotary member;

Fig. 8 is a longitudinal section similar to Fig. 7 but taken along the line VIII—VIII of Fig. 3 and showing the rotary valve member in the same position as is illustrated in Fig. 7;

Fig. 9 is a sectional view similar to Fig. 7, but taken in an opposite direction as is represented by the line IX—IX in Fig. 3 and showing the valve rotor in another of its operating positions;

Fig. 10 is a sectional view identical with Fig. 8 except for showing the valve rotor in the same position as is represented in Fig. 9;

Fig. 11 is a development of the cylindrical valve member showing diagrammatically the arrangement of the fluid passages and the ports in the valve rotor and valve body;

Fig. 12 is a fragmentary sectional view taken substantially along the line XII—XII of Fig. 5 and illustrating additional details of construction;

Fig. 13 is a perspective view illustrating the general form and appearance of a valve constructed in accordance with a modification of my invention;

Fig. 14 is a longitudinal sectional view taken substantially along the line XIV—XIV of Fig. 13;

Fig. 15 is a cross sectional view taken along the line XV—XV of Fig. 14; and

Fig. 16 is a perspective view illustrating the form and appearance of the valve rotor illustrated in Figs. 14 and 15.

Referring to the drawings, I have illustrated the preferred embodiment of my invention as comprising a valve body 1 which is preferably of cylindrical form and which is provided with a through cylindrical valve bore 2. Within the bore 2 there is mounted a rotary plug member indicated generally by the reference character 3. As will be described hereinafter, this plug member is adapted to be moved selectively to any one of three angular positions and includes means for establishing a fluid intercommunication between various fluid conduits to which the valve is to be connected.

These conduits are arranged to be attached to suitable connectors of fittings 4, 5, 6, and 7 which are preferably pressed in or otherwise suitably secured to the valve body 1 and serve to define, respectively, a pressure inlet port 8, a fluid return port 9 and a pair of cylinder ports 10 and 11. In the ordinary application of four-way control valves, the cylinder ports 10 and 11 will, through the medium of the connectors 6 and 7, be coupled to lines leading to opposite ends of a single hydraulic power cylinder so that the delivery of fluid under pressure to one end of such cylinder may cause the piston therein to move in one direction while delivery of fluid under pressure to the other end of such cylinder will cause the piston therein to move in the opposite direction.

The pressure inlet and return ports 8 and 9 are spaced axially of each other relative to the length of the cylinder bore 2 and are, by preference, angularly spaced 90°, although any desired angular arrangement of the ports 8 and 9 may be used. The cylinder ports 10 and 11 are axially aligned with respect to the length of the cylinder bore 2 to lie in the same radial plane and are positioned axially between the pressure inlet port 8 and the return port 9. The cylinder ports 10 and 11 are angularly spaced 90° with respect to each other and are, in accordance with the preferred embodiment of my invention, disposed at 45° with respect to the inlet port 8 and return port 9. While the specified angular spacing of the ports 10 and 11 with respect to each other is necessary, the angular relation of the location of these ports with reference to the inlet port 8 and return port 9 may be chosen as desired.

It will be appreciated also that while the preferred embodiment of my invention employs an angular spacing of 90° between the cylinder ports 10 and 11, other angular spacings may be used provided the principles of construction, which will be apparent with the following description, are adhered to. The angular relationships hereinafter specified as necessary are chosen by way of example only as representative of one set of angular relationships which will produce the desired results.

The rotary member 3 is mounted within the bore 2 as shown in Fig. 3 and is carefully machined or lapped to fit very closely within said bore so as to prevent fluid leakage between the outer surface of the rotary member 3 and the inner surface of the body member 1 defining the bore 2.

About the rotary member 3 there is extended a pair of axially spaced circumferential recesses 12 and 13 in axial positions aligning these recesses, respectively, with the pressure inlet ports 8 and the return port 9, and defining a land between the recesses. In the outer surface of the rotary member 3 there is also formed a pair of diametrically opposed axially extending recesses 14 and 14a, each intersecting the circumferential recess 13 and extending across the land toward the recess 12 a distance sufficient to permit the end of the recess 14 to be brought into register with the cylinder ports 10 and 11 upon appropriate rotation of the rotary member 3 through an arc of 90°. Similarly, there is provided a pair of diametrically opposed axially extending recesses 15 and 15a at 90° with respect to the recesses 14 and 14a, the recesses 15 and 15a communicating with the circumferential recess 12 and extending toward the recess 13 a distance sufficient to permit the recesses 15 and 15a to be brought into register with either of the cylinder ports 11 or 10, respectively, upon rotation of the member 3 through an angle of 90°.

When the rotor is in the position shown in Fig. 5, none of the recesses 14, 14a, 15, nor 15a is aligned with either of the cylinder ports 10 and 11 and the valve is thus disposed in a "neutral" position.

However, when the valve rotor 3 is moved from the position shown in Fig. 5 in a counterclockwise direction to the position shown in Figs. 7 and 8 (see also arrow "L," Fig. 11), the recess 14 is aligned with the cylinder port 10, and the recess 15 is aligned with the cylinder port 11. The recess 15 communicating with the annular recess 12 exposed to the pressure port 8 will pass pressure fluid toward and through cylinder port 11 while return fluid from the motive means will return through cylinder port 10, recesses 14 and 13 to the return port 9.

Likewise, when the valve rotor 3 is moved in a clockwise direction from the position shown in Fig. 5 to the position shown in Figs. 9 and 10 (see also arrow "R," Fig. 11), the recess 14 will be aligned with the cylinder port 11 at the same instant that the recess 15a will be aligned with the cylinder port 10 and fluid will flow from the pressure port 8 through the recesses 12 and 15a to the cylinder port 10 at the same time that return fluid from the fluid motor or other device controlled by the valve will return from such motive device through the cylinder port 11 and recesses 14 and 13 to the return port 9.

From the foregoing it will be observed that pressure fluid from the pressure source will at all times be present in the recesses 15 and 15a which, by reason of their disposition on diametrically opposite sides of the rotor 3, will cause the rotor to be hydraulically balanced within the bore 2 of the housing 1 and thus the rotor may be readily manipulated irrespective of the pressure of the source from which the fluid pressure is derived.

Similarly, when the recess 14 is aligned with either of the cylinder ports 10 or 11, any pressure exerted in the fluid returning through the cylinder ports will be exerted equally at the locations of recesses 14 and 14a upon diametrically opposite sides of the rotor and will impose no force tending to press the rotor against one side of the bore 2.

By referring particularly to Figs. 5 and 12, it will be observed that there is formed in the rotor 3 a short radial bore B-1 disposed in a circumferential alignment with the ends of the recesses 14 and 15 and approximately midway between the recesses 14 and 15. A second short bore B-2 extends from the diametrically opposite side of the rotor and is disposed midway between the recesses 14a and 15a, the bores B-1 and B-2 being interconnected by means of a relatively small port B-3. A pair of diametrically opposed bores B-4 and B-5 are similarly disposed, respectively, between the recesses 14 and 15a and between the recesses 15 and 14a and are interconnected by means of a small port B-6.

The diameters of each of the bores B-1, B-2, B-4, and B-5 are equal to the diameter of each of the cylinder ports extending through the housing 1 so that when the rotor 3 is in an intermediate or neutral position the bore B-4 will be aligned with the cylinder port 10 and the port B-1 will be aligned with the cylinder port 11, as shown in Fig. 5. Thus back pressure from the cylinders will be permitted to exert pressure forces on the rotor 3 at the bores B-2 and B-5, respectively, thus balancing the forces equally on four sides of the rotor 3.

The relation between the diameters of the bores B-1, B-2, B-4 and B-5 and the circumferential width of the recesses 14, 15, 14a and 15a should be selected such that the circumferential extent of the land between them is less than the circumferential spacing of the adjacent walls of the bores and recesses so that as the rotor is moved from a neutral position to a fluid flow position the cylinder ports will be exposed briefly to both one of the bores and one of the recesses.

From the foregoing it will be noted that in all operating positions of the rotor the pressure forces exerted on the rotor will be balanced on opposite sides thereof, this balance occurring not only when the rotor is in a position to supply pressure from the source to one or the other of the cylinder ports 10 and 11 but also when the rotor is in the neutral or off position.

This balancing of the rotor under all conditions of operation facilitates the movement of the rotor by relieving the rotor of resistance due to the high pressures of fluid which are to be controlled thereby and thus reducing the handle load imposed upon the rotor to substantially only that which is required to overcome the frictional resistance to turning of the rotor. In addition to reducing the handle load, it will be apparent that the forces exerted by the pressure fluid will be so balanced in each of the nominal positions of the rotor as to permit the rotor to be readily and easily moved to any position intermediate its operating positions and without any tendency of the pressure forces to either return the rotor to the position from which it has just been moved or tending to move the rotor to a further operating position.

This effect is accomplished by making the diameters of the bores B-1, B-2, B-4 and B-5 substantially equal to the area of the opening in the cylinder ports so that when the rotor is moved, the pressure forces are distributed to the opposite side of the rotor to be exposed over an area at the opposite side of the rotor equal to the areas of the cylinder ports.

For example, when the rotor is moved in a clockwise direction from the position shown in Fig. 5, the recess 15a which is continuously exposed to pressure from the pressure source, will move toward the cylinder port 10 and as the recess 15a starts to overlap the cylinder port 10 the pressure from the source will not only be exposed to the cylinder port 10 but some of the pressure will be exerted through the bore B-4, port B-6, and bore B-5 to act upon the opposite side of the rotor 3. Thus the pressure will be distributed not only on diametrically opposite sides of the rotor 3 but will be distributed equally between the recess 15 and the bore B-4, minimizing any tendency of the effect of the pressure fluid to cause the rotor 3 to move in either a clockwise or counterclockwise direction.

Similarly, upon the movement of the rotor as noted above, the return recess 14 will start to overlap the cylinder port 11 before the bore B-1 passes out of communication with the cylinder port 11. Thus any back pressures from the cylinder will be distributed equally, not only on opposite sides of the rotor but between the bore B-1 and the recess 14, and the effect of the back pressure tending to rotate the rotor will be minimized. By this arrangement the rotor may be set in any intermediate position between neutral and full open position communicating with either cylinder port 10 or cylinder port 11. Thus the valve will act to meter the fluid supplied to the cylinder to control the speed of movement of the cylinder and its acceleration or deceleration.

By referring particularly to Fig. 11, it will be observed that a small channel B-7 may be provided in the outer face of the rotor to interconnect the bore B-5 with the recess 14a, interconnecting the bores B-5 and B-4 at all times with the return annular recess 13. The rotor is adapted for use as an open center valve to permit any expansion of fluid in the cylinder to bleed fluid to the return port and thus to prevent the imposition of undue strains upon the power mechanism and the fluid lines interconnecting the same with the control valve.

Adjacent the recess 12 I prefer to provide a circumferentially extending groove 16, within which is located a sealing member 17 of the O-ring type adapted to make sealing engagement with the body member 1 and prevent fluid leakage axially of the bore 2. Similarly, a circumferential groove 18 may be formed in the body member 1 to receive an O-ring sealing member 19 to seal the opposite end of the rotor 3 against the leakage of fluid at that end of the rotor.

The rotary member 3 preferably includes a portion 20 which is extended exteriorly of the body member 1 and which is provided with a transversely extending bore 21. Preferably also a short axially extending cylindrical bore 22 is formed in the portion 20. The portion 20 with the bores 21 and 22 serves as a coupling member by means of which the rotary member 3 may be angularly moved. For manual operation a suitable handle may be inserted in the apertures 21 and the valve operated by imparting an angular motion to such handle member. For remote or power driven operation a coupling member may be inserted into the bore 22 and non-rotatably secured to the rotary member 3 as by passing a pin through the apertures 21. Thus, it will be seen that the valve is readily adaptable for use either as a manually operable valve or for remote or power operation through the use of a rotary valve operating shaft.

While the rotor may be held within the body 1 against axial movement by any suitable means and any suitable well-known detent mechanism may be employed to hold the rotor in any of its rotational positions, I have devised a simple mechanism for accomplishing both of these purposes which comprises a spring member 23 having the shape illustrated particularly in Figs. 1 and 3—that is, substantially E-shaped. The ends 24 and 25 of the spring are preferably inserted through bores 26 and 27 extending radially through the body 1, the ends of the spring 23 extending into a semicircular circumferential recess 28 formed in the rotor 3. The spacing of the bores 26 and 27 and the length of the recess 28 is such that the ends 24 and 25 of the spring 23 may act as limit stops, limiting the rotational movement of the rotor from its neutral position as shown in Fig. 3 to either of its active positions supplying fluid to the cylinder ports 10 or 11.

In circumferential alignment with the circumferential recess 28, I provide three depressions 29, 30 and 31 preferably formed as countersunk bores adapted to be exposed to the middle leg 32 of the E-shaped spring 23, the leg 32 extending through a shallow cut 33 formed through the body 1. The leg 32 therefore acts as a spring detent adapted to be engaged in any one of the recesses 29, 31 and 30 when the rotor has been moved, respectively, to its neutral position or either of its active positions.

For convenience in construction I prefer to provide in the member 3 a short axially extending bore 34 which has a depth sufficient to intersect the slot 28 and the depressions 29—31. After these openings are formed, a thin hardened sleeve 35 may be pressed into the bore 34 to provide a bearing surface against which the inner ends of the end portions 24 and 25 may bear and against which the displaced detent portion 32 may bear. By forming the sleeve 35 of extremely hard material, scoring thereof is avoided and the frictional resistance to rotation of the plug member 3 is kept to a minimum.

In Figs. 13 through 16 I have shown a modified form of the rotary valve of this invention which is particularly adapted for remote operation because of the extremely small torque required to move the rotary valve member. The valve illustrated in these figures comprises a cylindrical valve body 101 which is formed with a valve cylinder bore 102 rotatably receiving a rotating valve member or rotor 103. The rotor 103 is similar to the rotor 3 hereinbefore described, and includes the annular inlet recess 12 connected to the diametrically opposed axial recesses 15 and 15a, and includes the annular return recess 13 connected with the diametrically opposed axially extending recesses 14 and 14a. Interconnected blind bores B–1, B–2 and B–4, B–5 are also provided as in the first described form of my invention.

The valve member 103 fits very closely within the bore 102, the valve member 103 and the valve body 101 being lapped together so as to provide an extremely close fit between the rotary valve member 103 and the bore 102 within which it is received. The fit is sufficiently close to substantially prevent leakage between the valve member and the walls of the valve cylinder, but the clearance, although extremely small, is sufficient to allow the valve member to be freely rotated within the bore.

The valve body 101 provides a connection 104 for the attachment of a line extending to the source of pressure fluid, a connection 105 for attachment to a return line, and connections 106 and 107 for attachment to the opposite ends of the fluid actuated cylinder to be controlled by the valve. These connections communicate, respectively, with an inlet port 8, a return port 9, and two cylinder ports 10 and 11, each of the ports 8—11 extending into the cylinder bore 102. The inlet port 8 may be placed in any desired circumferential position, but is so located axially as to communicate with the annular inlet recess 12. Similarly, the return port 9 may be placed in any desired circumferential position, but is so positioned axially as to communicate with the annular return recess 13. The cylinder ports 10 and 11 are circumferentially spaced 90° from each other, and are placed in an axial position lying substantially midway between the recesses 12 and 13 so as to register with the end portions of the axial recesses 14, 14a, 15 and 15a, and the blind bores B1, B2, B–4, and B–5.

The valve member 103 is confined within the bore 102 by a mounting plate member 108 which is secured by any suitable means to one end of the valve body 101, and by a cover plate member 109 which is secured as by means of screws 110 to the opposite end of the valve body. Opposite end faces of the valve body are counterbored to provide annular grooves 111 and 112 within which are placed O-ring sealing members 113 and 114. These members are clamped between the valve body and the mounting plate 108 and between the valve body and the cover plate 109, respectively.

The counterbores 111 and 112 and the O-rings 113 and 114 are made of a diameter sufficient to prevent engagement between the inner surface of the O-rings and the outer surface of the rotary valve member 103. The O-rings 113 and 114 thus serve to establish a seal between the valve body 101 and the mounting plate 108, and between the valve body 101 and the cover plate 109, but do not provide any seal or any frictional engagement with the rotary valve member 103.

The valve rotor 103 is adapted to be rotated to its various positions by means of an operating shaft portion 115 preferably formed integrally with the member 103, and extending exteriorly of the valve body through a suitable opening 116 provided in the cover member 109. A small light O-ring seal 117 placed between the shaft 115 and the cover 109 serves to prevent fluid leakage around the shaft 115. As will be explained hereinafter, the counterbore 112 is drained so that no appreciable pressure is exerted on the upstream side of the seal 117, even though pressures as high as 3000 p. s. i. may be applied at the inlet port 8. By this construction the seal 117 may be made extremely light so as to provide a minimum of frictional engagement with the shaft 115 and so reduce to an absolute minimum the frictional resistance to turning of the valve member 103. The shaft 115 may be provided with a transverse bore 118 near its outer end to facilitate connection thereto of any type of remote operating means which is to be used to effect movement of the valve member 103.

As before stated, the counterbore 112 is drained, and to this end I provide a bleeder bore 119 which is extended diametrically through the valve member 103 at an axial location such as to register and communicate with the counterbore 112. The bore 119 is intersected by an axially extending passage 120 which in turn intersects a diametrically disposed bleeder bore 121 so axially located as to communicate with the return annular recess 13. By this construction the small amount of fluid leaking past the lapped fit between the valve member 103 and the cylinder wall 102 and accumulating in the counterbore 112 is returned through the passage 119, 120 and 121 to the return recess 13 so as to be drained off through the connection 105 to the reservoir of the hydraulic system.

The structure just described is similar to the modification of the invention first described, and provides for a balancing of the pressure forces on the valve rotor in the three nominal positions of the valve as has been hereinbefore explained. However, the valve shown in Figs. 13 and 16, being particularly adapted for operation by low-powered remote operating mechanism, is arranged to be completely and precisely balanced in intermediate or throttling positions situated between the nominal operating positions. This result is achieved by providing a blind bore 130 in the valve body 101 and communicating with the cylinder bore 102, the blind bore 130 being disposed diametrically opposite the cylinder port 10 and having the same diameter. A similar blind bore 131 is disposed diametrically across from the cylinder bore 11.

The way in which the two blind bores 130 and 131 contribute to the balancing of the forces acting on the rotary valve 103 during movement of the valve between its nominal positions may best be understood by having reference to Fig. 15 and assuming the valve rotor 103 to be turned a very slight distance in a clockwise direction, a distance not sufficient to bring the blind bores B–1 to B–5 into communication with either of the ports 10 or 11. When the rotor is moved in a clockwise direction by such a small amount, the area adjacent the port 11 on which the supply pressure acts is increased by an increment equal to the amount by which the port 11 overlaps the land on the counterclockwise side of the axial recess 15. This increase in effective area increases the force tending to push the valve member to one side to the left as viewed in Fig. 15. However, the provision of the bore 131 provides an equal increase in area on the opposite side because the bore 131 similarly overlaps the land on the counterclockwise side of the axial recess 15a. This increase in area is equal to the increase in area adjacent the cylinder port 11, and since the passages 15 and 15a are interconnected by the annular recess 12, the pressures acting on the correspondingly increased areas are equal and the valve remains balanced.

A similar relation exists with reference to the cylinder port 10 and the blind bore 130 so that an otherwise unbalanced force resulting from an increase in area in the region of the port 10 is balanced by an equal increase in effective area in the region of the blind bore 130.

As was described with reference to the first-mentioned form of this invention, the diameter of the blind bores in the rotor is made sufficient to bring them into communication with the ports 10, 11 or the blind bores 130, 131 before the communication of those ports and bores with the recesses 14, 14a and 15, 15a is broken. Thus the hydraulic forces acting on the rotor 103 and otherwise tending to laterally displace the rotor and provide a frictional engagement of the rotor with the cylinder wall 102 are accurately and precisely balanced regardless of the angular position of the valve rotor 103.

Since the hydraulic forces acting on the valve rotor 103 are completely and accurately balanced in all possible positions of the valve rotor, it is seen that the only resistance to the turning of the valve rotor is the frictional engagement in the lapped fit between the rotor 103 and the cylinder wall 102, the frictional engagement of the light O-ring 117 with the shaft 115, and the hydraulic forces resulting from the turbulent flow of fluid through the valve in its operating positions. Actual tests with valves constructed as shown in Figs. 13–16 indicate that the sum of these frictional forces is so low that a torque of only a few inch ounces is required to move the valve rotor with supply pressures as high as 3000 p. s. i. Thus the valve is particularly adapted for operation by remote operating mechanisms such as may be controlled by the output of a radio receiver.

From the foregoing it will be observed that I have provided a control valve which is especially adapted for use with high fluid pressures by virtue of the balancing of the rotor in any of its operating positions, and in all intermediate or throttling positions. It will be seen that the construction of the valve body and the valve rotor is comparatively simple, permitting the valve to be manufactured at relatively low cost by simple standard machining operations. It will also be noted that the arrangement of the recesses 12, 15, 15a and 13, 14, 14a is such as to provide a path of movement for the fluid through the valve with a minimum of restrictions and with a minimum of tortuousness which facilitates the flow of fluid through the valve and reduces the pressure loss to a minimum. Attention is also directed to the provision of the blind bores B-1, B-2 and B-4, B-5, and 130, 131 which cooperate with the valve ports in the valve body to provide a precise balancing of the hydraulic forces tending to move the valve rotor laterally in the valve cylinder.

While I have illustrated and described both embodiments of my invention as comprising four-way control valves, it will be apparent that the principles of my invention are equally adapted to other control valves by properly arranging the recesses and the bores to accomplish the pressure balancing results in the manner described herein.

While I have shown and described the preferred embodiments of my invention, I do not desire to be limited to any of the details of construction shown or described herein, except as defined in the appended claims.

I claim:

1. In a fluid control valve, the combination of: a valve body having a cylindrical bore formed therein and having an inlet and an outlet port extended radially into said bore, said ports being spaced axially along said bore, said body having also formed therein a pair of radially extending cylinder ports, said cylinder ports being disposed axially between said inlet and outlet ports and spaced circumferentially of each other, and a rotary member mounted for rotation in said bore, said member having a circumferential recess alignable with said inlet port, a pair of axially extending recesses communicating with said circumferential recess and being disposed on diametrically opposite sides of said rotary member, at least one of said axial recesses extending along the rotary member to a position alignable with the cylinder ports upon rotation of said rotary member, a second circumferential recess aligned with said outlet port, and a pair of axially extending recesses communicating with said second circumferential recess and disposed on diametrically opposite sides of said rotary member, at least one of said last named axial recesses including a portion alignable with said cylinder ports upon rotation of said rotary member, said rotary member having a pair of independent transverse fluid passages formed therethrough, each of said passages opening on said rotary member intermediate said axially extending recesses at diametrically opposed locations axially aligned with said cylinder ports and adapted to be exposed to said cylinder ports when the rotor is in a position spacing said axial recesses from said cylinder ports, whereby the rotor is balanced in the neutral or shut-off position from pressures existing in the cylinder ports.

2. In a fluid control valve, a tubular valve body having a cylindrical bore therethrough and having a pair of apertures extending radially into said bore and angularly spaced in a radial plane a distance less than one-half of a circumference, said body also having formed therein a tangential slot communicating with said bore in axial alignment with said apertures and positioned on the opposite side of said bore from said apertures; a cylindrical rotary member mounted for rotation in said bore having a groove extending circumferentially thereabout an angular distance less than a full circle and in a position aligned with said apertures, said rotary member having also formed therein a plurality of depressions disposed between the ends of said groove and in alignment therewith; and a spring stop device comprising a single length of spring material with the ends thereof passed through said apertures and entering said groove, said spring material being extended circumferentially about the outside of said body and including an inwardly displaced portion passing through said tangential slot to engage said depressions for yieldably holding said rotary member in each of a plurality of angular positions, whereby said ends limit the angular movement of said rotary member and normally prevent axial movement thereof in said bore.

3. A pressure balanced rotary four-way valve comprising: a valve body having an inlet and outlet port and two cylinder ports; and a rotor disposed in said body having operating passages to selectively connect the cylinder ports in opposite sense to the inlet and outlet ports and also having a neutral or shut-off position, said rotor having two pairs of bores so disposed therein that a first bore of each pair will be opposite a cylinder port when the valve is in neutral position, the other bore of each pair being diametrically opposed to said first bore, said rotor having a pair of passages, each of said passages interconnecting diametrically opposed bores, said passages being mutually independent, whereby the rotor is balanced in the neutral or shut-off position from pressures existing in the cylinder ports, the circumferential dimension between each bore and an adjacent operating passage being just slightly less than the circumferential width of the inlet and outlet ports.

4. A pressure balanced rotary four-way valve comprising: a valve body having an inlet and outlet port and two cylinder ports; and a rotor disposed in said body having operating passages to selectively connect the cylinder ports in opposite sense to the inlet and outlet ports and also having a neutral position, said rotor having two pairs of bores so disposed therein that a first bore of each pair will be opposite a cylinder port when the valve is in said neutral position, the other bore of each pair being diametrically opposed to said first bore, said rotor having a pair of passages, each of said passages interconnecting diametrically opposed bores, said passages being mutually independent, whereby said rotor is balanced in the neutral or shut-off position from pressures existing in the cylinder ports, said valve body having a pair of pockets disposed in positions to register with said other bores when said first bores are in register with said cylinder ports, said pockets having the same cross sectional shape and area as said cylinder ports.

5. A pressure balanced rotary four-way valve comprising: a valve body having an inlet and outlet port and two cylinder ports; and a rotor disposed in said body having operating passages to selectively connect said cylinder ports in opposite sense to said inlet and outlet ports and also having a neutral position, said rotor having two pairs of bores so disposed therein as to register one of the bores of each of said pairs with one of said cylinder ports in said neutral position of said rotor, the other bore of each of said pairs being diametrically opposed to said first bore, and said rotor having a pair of passages, each of said passages interconnecting diametrically opposed bores, said passages being mutually independent, whereby said rotor is balanced in the neutral or shut-off position from pressures existing in the cylinder ports.

6. In a fluid control valve, the combination of: a valve body having a cylindrical bore formed therein and having an inlet and an outlet port extended radially into said bore, said ports being spaced axially along said bore, said body having also formed therein a pair of radially extending cylinder ports, said cylinder ports being disposed axially between said inlet and outlet ports and spaced circumferentially of each other, and a rotary member mounted for rotation in said bore, said member having a circumferential recess alignable with said inlet port, a pair of axially extending recesses communicating with said circumferential recess and being disposed on diametrically opposite sides of said rotary member, at least one of said axial recesses extending along the rotary member to a position alignable with the cylinder ports upon rotation of said rotary member, a second circumferential recess aligned with said outlet port, and a pair of axially extending recesses communicating with said second circumferential recess and disposed on diametrically opposite sides of said rotary member, at least one of said last named axial recesses including a portion alignable with said cylinder ports upon rotation of said rotary member, said rotary member having a pair of independent transverse fluid passages formed therethrough, each of said passages opening on said rotary member intermediate said axially extending recesses at diametrically opposed locations axially aligned with said cylinder ports and adapted to be exposed to said cylinder ports when the rotor is in a position spacing said axial recesses from said cylinder ports, said valve body having a pair of pockets opening on said cylinder bore and disposed diametrically opposite said cylinder ports, said pockets having the same cross sectional shape and area as said cylinder ports, whereby the rotary member is balanced in the neutral or shut-off position from pressures existing in the cylinder ports.

7. In a fluid control valve, the combination of: a valve body having a cylindrical bore formed therein and having an inlet and an outlet port extended radially into said bore, said ports being spaced axially along said bore, said body having also formed therein a pair of radially extending cylinder ports, said cylinder ports being disposed axially between said inlet and outlet ports and spaced circumferentially of each other, a rotary member mounted for rotation in said bore, said member having a circumferential recess alignable with said inlet port, a pair of axially extending recesses communicating with said circumferential recess and being disposed on diametrically opposite sides of said rotary member, at least one of said axial recesses extending along the rotary member to a position alignable with the cylinder ports upon rotation of said rotary member, a second circumferential recess alignable with said outlet port, a pair of axially extending recesses communicating with said second circumferential recess and disposed on diametrically opposite sides of said rotary member, at least one of said last-named axial recesses including a portion alignable with said cylinder ports upon rotation of said rotary member, said rotary member having a pair of independent transverse fluid passages formed therethrough, each of said passages opening on said rotary member intermediate said axially extending recesses at diametrically opposed locations axially alignable with said cylinder ports and adapted to be exposed to said cylinder ports when the rotor is in a position spacing said axial recesses from said cylinder ports, whereby the rotary member is balanced in the neutral or shut-off position from pressures existing in the cylinder ports, and releasable means on said body and normally engaging said rotary member for holding said member in an axial position in said cylindrical bore axially aligning said recesses with said ports while permitting rotation of said rotary member.

8. A pressure balanced rotary four-way valve comprising: a valve body having a cylindrical bore therethrough and having an inlet and outlet port and two cylinder ports; a rotor disposed in said cylindrical bore having operating passages to selectively connect the cylinder ports in opposite sense to the inlet and outlet ports and also having a neutral or shut-off position, said rotor having two pairs of bores so disposed therein that a first bore of each pair will be opposite a cylinder port when the valve is in neutral position, the other bore of each pair being diametrically opposed and intercommunicated with said first bores, the circumferential dimension between the bores and an adjacent operating passage being just slightly less than the circumferential dimensions of the inlet and outlet ports, said body having a pair of apertures extending radially into said cylindrical bore and angularly spaced in a radial plane a distance less than one-half of a circumference, said rotor having a groove extending circumferentially thereabout an angular distance less than a full circle and in a position aligned with said apertures; and a pair of spring-pressed stop pins in said apertures and entering said groove, whereby said stop pins limit angular movement of said rotor and normally prevent axial movement of said rotor in said cylindrical bore, and whereby withdrawal of said spring-pressed stop pins from said groove permits axial removal of said rotor from said cylindrical bore.

References Cited in the file of this patent

UNITED STATES PATENTS

| | | |
|---|---|---|
| 849,724 | Christ | Apr. 9, 1907 |
| 1,576,063 | Penberthy | Mar. 9, 1926 |
| 1,814,534 | Van Etten | July 14, 1931 |
| 2,182,459 | Vickers | Dec. 5, 1939 |
| 2,312,941 | Tucker | Mar. 2, 1943 |
| 2,313,257 | Nelson | Mar. 9, 1943 |
| 2,398,542 | Light | Apr. 16, 1946 |